(Model.)
D. W. CURTIS.
ICE CREAM FREEZER.
No. 289,336. Patented Nov. 27, 1883.
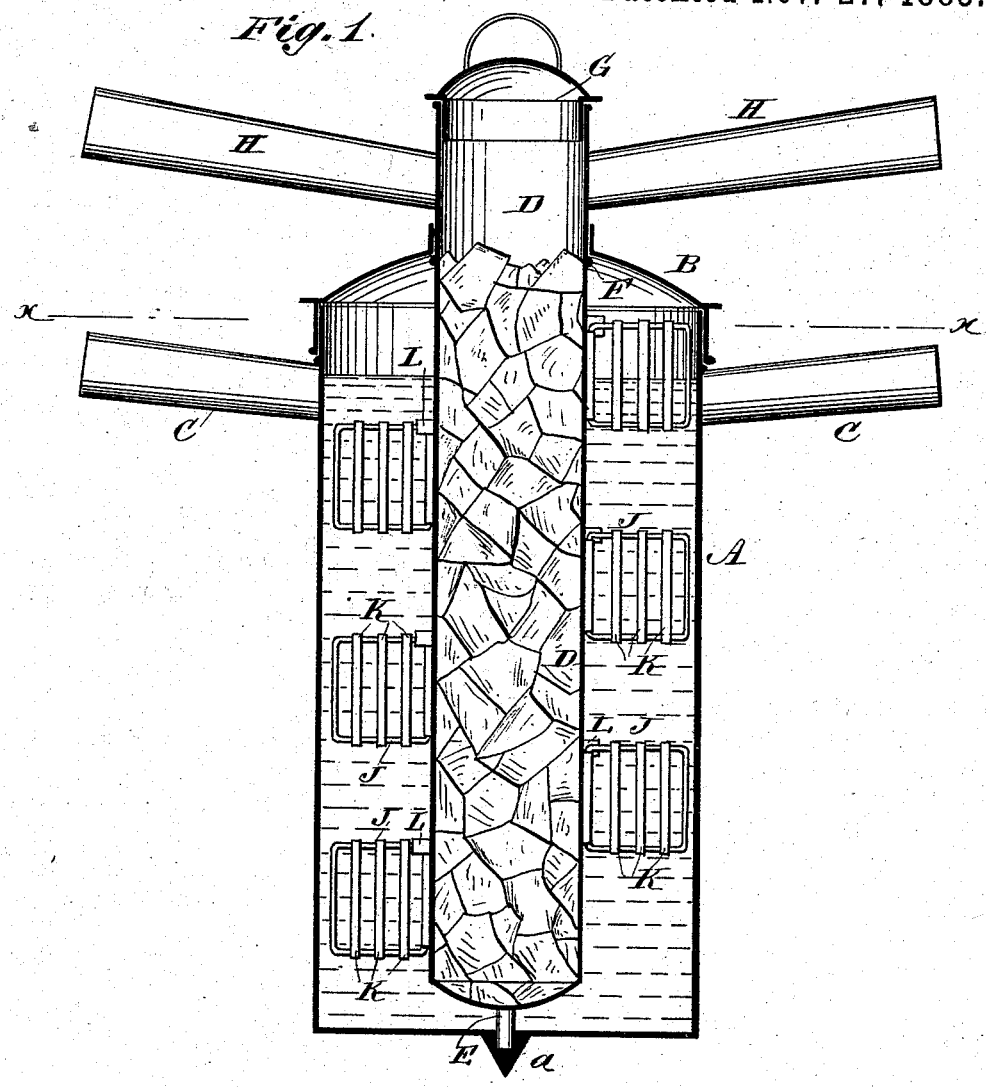
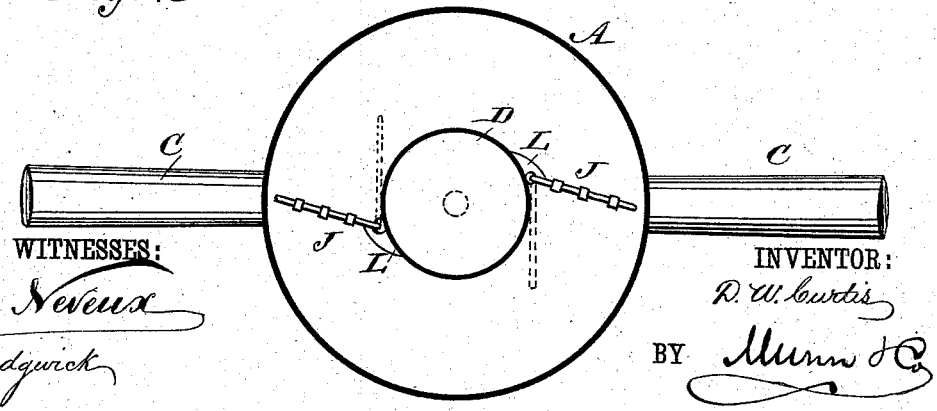
WITNESSES:
C. Neveux
C. Sedgwick
INVENTOR:
D. W. Curtis
BY Munn & Co.
ATTORNEYS.

UNITED STATES PATENT OFFICE.

DUDLEY W. CURTIS, OF POMEROY, OHIO, ASSIGNOR OF ONE-HALF TO SAMUEL DAVIS, OF SAME PLACE.

ICE-CREAM FREEZER.

SPECIFICATION forming part of Letters Patent No. 289,336, dated November 27, 1883.

Application filed July 14, 1883. (Model.)

*To all whom it may concern:*

Be it known that I, DUDLEY W. CURTIS, of Pomeroy, in the county of Meigs and State of Ohio, have invented a new and Improved Ice-Cream Freezer, of which the following is a full, clear, and exact description.

The object of my invention is to provide a new and improved ice-cream freezer, which is so constructed that it prevents the cream from freezing into lumps, and in which the cream can be congealed uniformly and very rapidly.

Reference is to be had to the accompanying drawings, forming part of this specification, in which similar letters of reference indicate corresponding parts in both the figures.

Figure 1 is a longitudinal sectional elevation of my improved ice-cream freezer. Fig. 2 is a sectional plan view of the same on the line $x\ x$, Fig. 1.

The prepared cream is poured into a cylindrical vessel, A, provided with a cover, B, which vessel can be placed in a tub and surrounded by ice in the usual manner, the vessel being provided with a pivot, $a$, on its bottom, and with handles C on the sides, to facilitate revolving it on its longitudinal axis. The cover B is provided with a central aperture, through which a smaller cylindrical vessel, D, passes, which is provided on its bottom with a pivot, E, on which the inner vessel can turn. The inner vessel, D, is provided with an annular head, F, directly below the cover B, which head holds the vessel D in place within the vessel A. The vessel D is provided with a cover, G, and with handles H. On the outer surface of the inner cylindrical vessel, D, a series of wings or paddles, J, are hinged, which consist of frames having a series of vertical transverse rods, K. The paddles or wings are pivoted to lugs or jaws L on the vessel D in such a manner that they can swing from the vessel until they stand tangentially to the same, but no farther, but can swing against the vessel in the inverse direction—that is to say, if the inner vessel, D, is turned in one direction on its longitudinal axis, the wings or paddles J will project from the same, and if the said vessel is turned in the inverse direction, the paddles will fold against the side of the vessel—thus permitting of withdrawing the inner vessel, D, without disturbing or cutting the partly-congealed cream surrounding it. While turning the vessel D, to cause the cream to freeze, the paddles J agitate the cream, and prevent it from freezing into lumps, &c. Ice is to be placed into the vessel D, and, as stated above, the vessel A can also be surrounded by ice, so that the cream will be between two layers of ice, or the outer vessel, A, can be used without surrounding it with ice. The freezer can be made in different sizes, as may be required. The wings J are preferably hinged, but can be made rigid, if desired.

I am aware that it is not new in ice-cream freezers to have the cream-chamber within or around the ice-chamber, or between the two, or to rotate the cream-chamber, the central ice-chamber, or both; but What I do claim as new and of my invention is—

1. The revolving ice-chamber D, having annular head F and bottom pivot, E, in combination with a cream-chamber having a bottom step or bearing on the inside and a cover surrounding said ice-chamber just above said head, as shown and described.

2. The ice-chamber of a cream-freezer, provided with wings hinged on opposite sides to alternate, as shown and described.

3. The central ice-chamber wings, J, formed of a hinged quadrangular bar spanned vertically by rods K, placed at intervals, as shown and described.

DUDLEY W. CURTIS.

Witnesses:
H. L. MOORE,
WALTER E. HYSELL.